March 29, 1932. J. J. SKELLY 1,851,016
VALVE
Filed Dec. 19, 1929 3 Sheets-Sheet 1
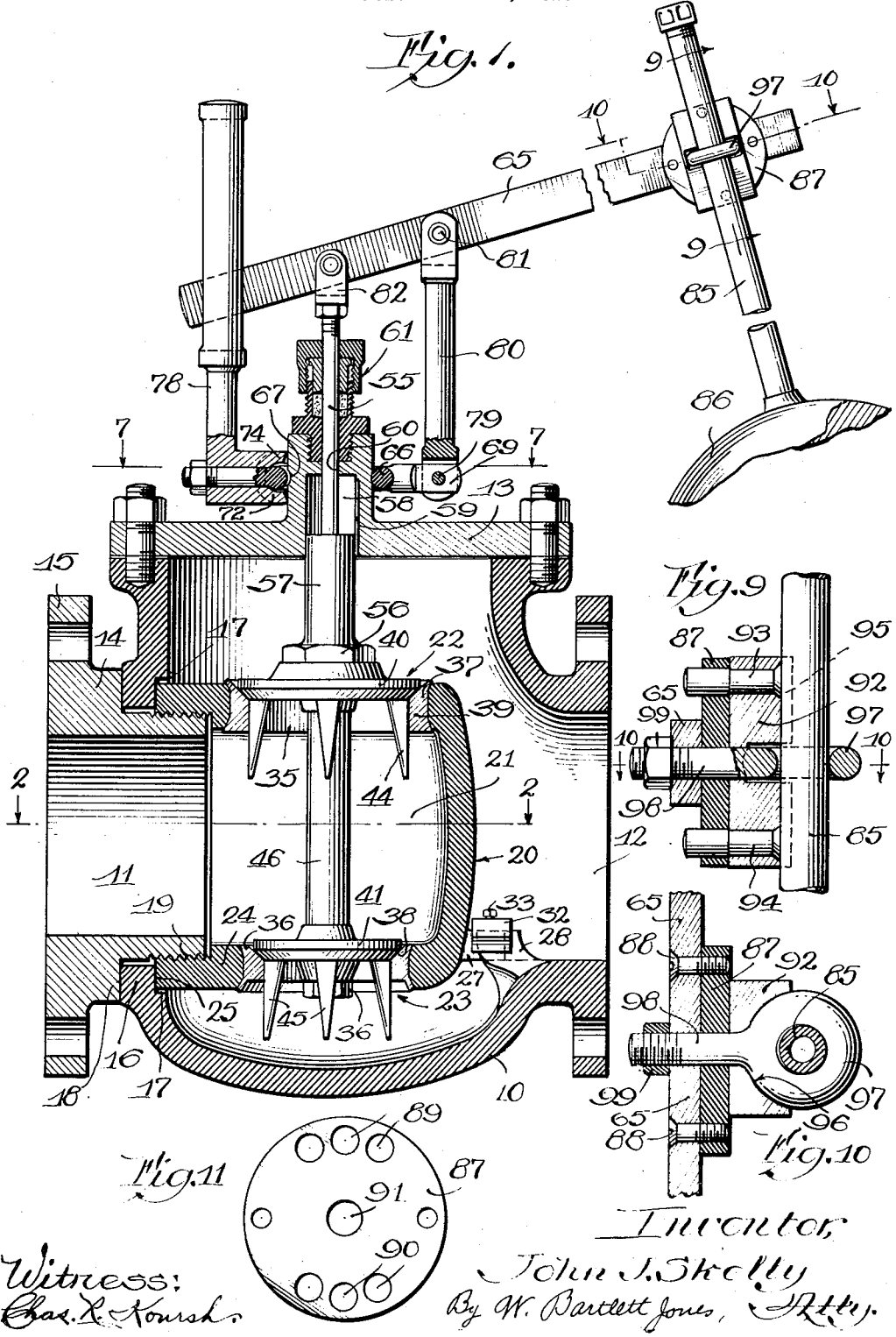
Inventor
John J. Skelly
By W. Bartlett Jones, Atty.
Witness:
Chas. R. Koursh March 29, 1932.  J. J. SKELLY  1,851,016
VALVE
Filed Dec. 19, 1929   3 Sheets-Sheet 2
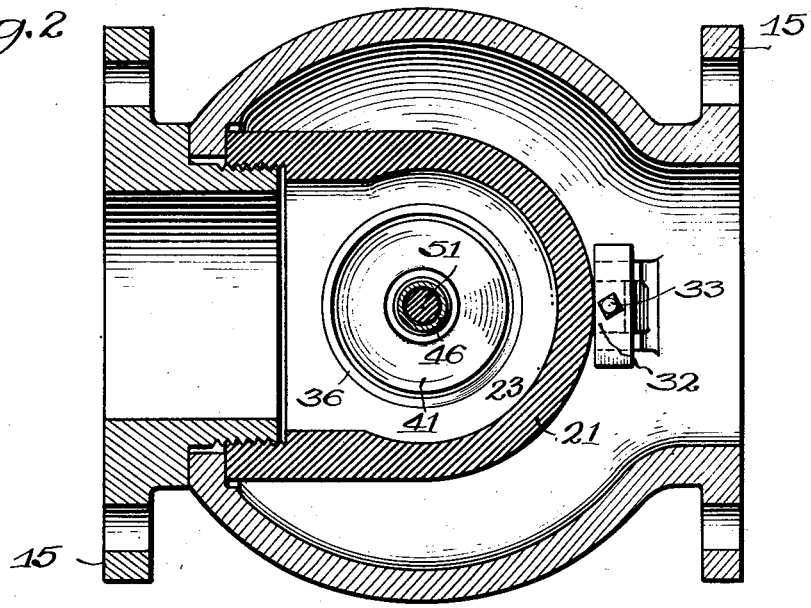
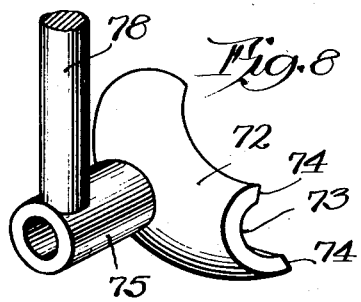
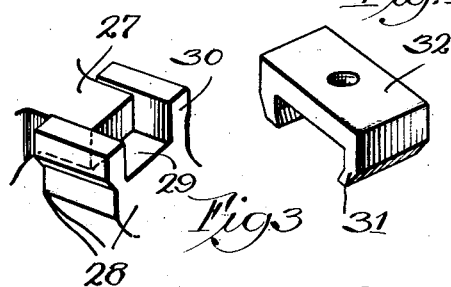
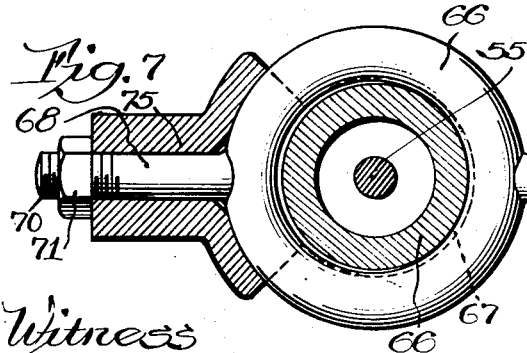
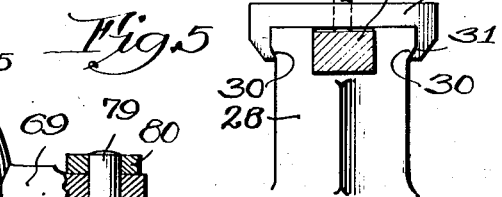
Inventor,
John J. Skelly,
By W. Bartlett Jones, Atty.

March 29, 1932.  J. J. SKELLY  1,851,016
VALVE
Filed Dec. 19, 1929  3 Sheets-Sheet 3
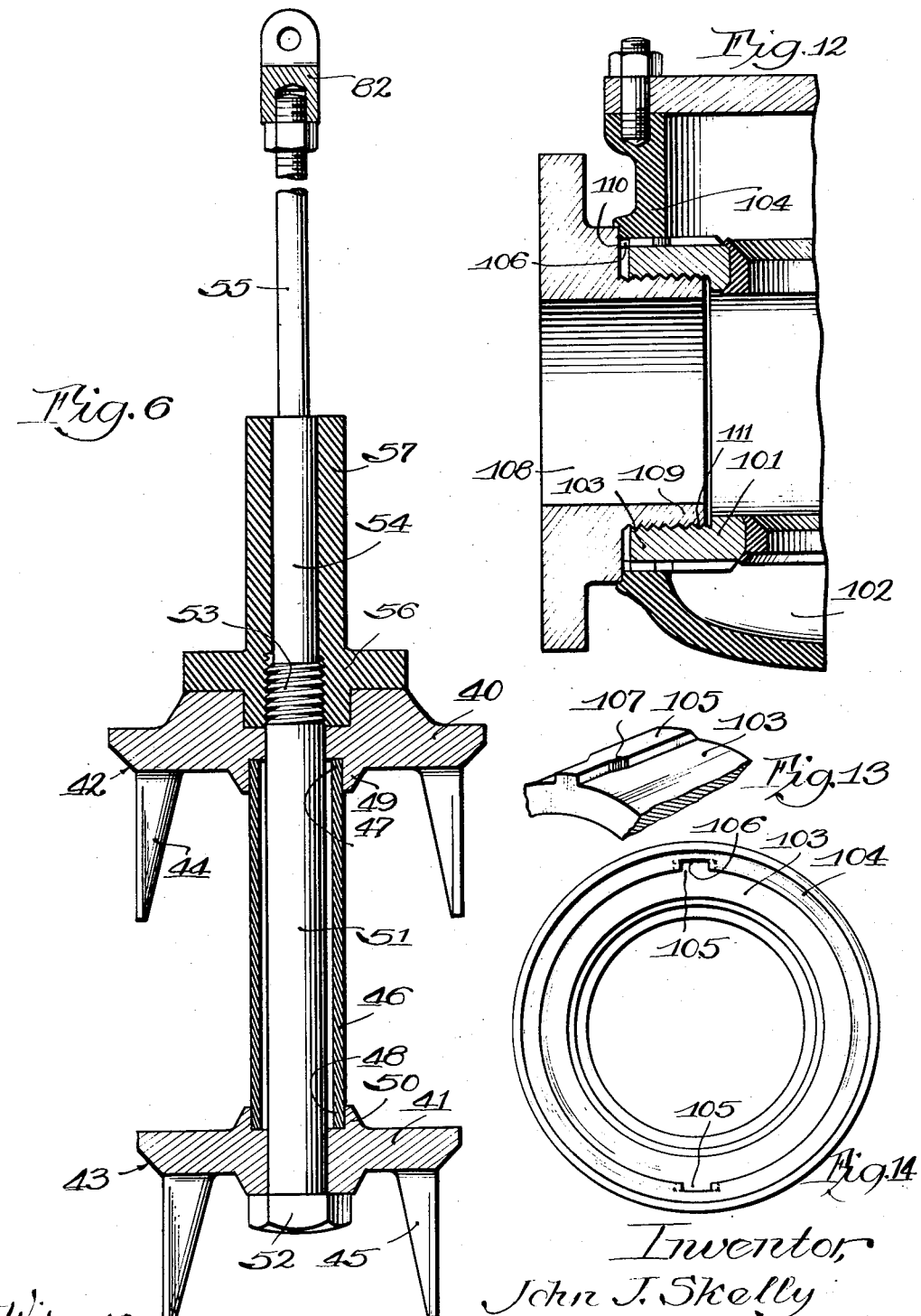

Patented Mar. 29, 1932

1,851,016

UNITED STATES PATENT OFFICE

JOHN J. SKELLY, OF CHICAGO, ILLINOIS

VALVE

Application filed December 19, 1929. Serial No. 415,215.

The present invention relates generally to valves and has particular reference to valve construction.

In float operated valves it is important to provide a balanced valve so that the pressure of water to be released or controlled by the valve has little effect on the forces acting through the float to move the valve. Much experience with valves for this purpose has demonstrated that the upkeep or replacement cost for such valves is high owing to the structure heretofore employed. The seating of the valve is not perfect after a period of use, through wear, corrosion and other factors. It is necessary to reseat the valve, or even to replace it. This requires taking the valve out of use entirely, and is a practical difficulty in certain places where such valves are used.

The present invention aims to overcome these difficulties by providing a valve with a removable valve unit which may be taken out of the valve casing, and easily reground with a grinding composition without handling the whole valve. It also permits using one valve casing and duplicating valve units, one of which may always be kept in reserve to be conditioned while the other is in use. Such a construction provides for a reduction in maintenance cost and in equipment in places like boiler rooms, and it limits the time of shut down which may be required to repair or recondition a single valve.

One object of the invention is to provide a valve casing with a removable valve unit.

Another object of the invention is to provide a new and novel means for mounting the removable unit in the valve.

Another object of the invention is to provide a balanced action valve.

Still another object of the invention is to provide a float operated valve and to employ therein certain improved structures for various parts of the valve.

Various other objects and advantages of the invention will be apparent from the following description of the invention which is described and explained by reference to the exemplary embodiments of the invention shown in the accompanying drawings, in which Fig. 1 is a vertical cross section of a valve showing means for operating a plunger stem by a valve operating float, and showing the construction and the mounting of the removable valve unit in the valve casing.

Fig. 2 is a horizontal cross section of the valve taken on the line 2—2 of Fig. 1.

Figs. 3, 4 and 5 are detailed views of means for holding the valve unit in the valve casing non-rotatably with respect thereto.

Fig. 6 is a detailed view of the construction of the stem and valve members of the valve unit.

Fig. 7 is a horizontal cross section of means for mounting a lever arm construction on the top of the valve casing, being a section taken on line 7—7 of Fig. 1.

Fig. 8 is a detailed view of the yoke member which is shown in Fig. 7.

Fig. 9 is a cross section of a mounting means by which a float-carrying arm is attached to the valve operating lever, being a cross section on line 9—9 of Fig. 1.

Fig. 10 is a cross section of the device of Fig. 9, taken on the line 10—10 of Figs. 1 and 9.

Fig. 11 is a detailed view of one of the parts shown in Figs. 9 and 10.

Fig. 12 is a modified form of mounting for the valve unit and the valve casing.

Fig. 13 is a detailed perspective view of the key in the modified form of Fig. 12.

Fig. 14 is an end view of the device of Fig. 12 with the flanged port-forming nipple removed.

It is to be understood that the invention is not to be considered as limited by the detailed disclosure of the drawings and the description thereof, and that certain changes and modifications may be made within the scope of the invention, and all such changes, modifications, and other constructions are contemplated which may fall within the scope of the appended claims defining the invention.

In general the valve comprises a casing having removable parts, which when mounted in fixed position hold an internal and removable valve structure in its proper position, and which when out of place permit removal of said structure bodily from the valve casing. The removable valve unit has a combined seat and valve member forming a simple unit that may be reconditioned outside of the valve. It also has a structure adapted to produce a balanced action in operation.

A valve casing 10 has ports 11 and 12. The casing has a removable portion such as plate 13 of sufficient size to permit forming in the casing an opening that will receive the valve unit later to be described. The plate 13 is made the entry for the valve operating structure as will later appear. The casing has also another removable part, such as the nipple-like structure 14 containing a flange 15 of one of the ports, which is mounted into the valve casing by cooperative engagement with the valve unit. The parts are so arranged that by securing the nipple 14 to the valve unit, the latter is fixedly mounted and the valve structure completed.

The casing has one side suitably constructed for the port 11 defined by a circular opening in the casing and is designated by wall 16 having a uniform thickness obtained by machining or grinding. On the inside there is a shoulder 17 of larger diameter to provide a circular depression in the valve casing about the opening for the port. The nipple structure 14 may be inserted into the opening for the port and has a flange 18 fitting snugly against the outer side of wall 16. The inserted end of structure 14 is adapted to engage the valve unit and is preferably threaded as shown at 19.

The valve unit is generally designated 20 for reference purposes. It is of such size and shape that it may be readily moved into and out of the casing when the plate 13 is removed. It comprises generally a housing having two valve seats and two seating valve members operated together in the same direction on a single stem, as a pressure balancing structure.

More specifically, the valve unit has a housing 21, one end of which may be somewhat globular, as seen in Fig. 2, with somewhat flattened top 22 and bottom 23. The other end terminates in a tubular form 24 which is circular in the drawings. The circular end is internally threaded to receive the threads 19 on the nipple 14. The end of the tube is adapted to fit tightly against the wall 16 of the valve casing, but packing means may be inserted if desired without in anyway departing from the invention. A machined surface is illustrated preventing the necessity for the use of packing. In threading the valve unit 20 and the nipple 14 together, the casing wall 16 is clamped between them, causing the valve unit to be mounted projecting inwardly into the casing from the interior of its wall.

To strengthen its mounting and to maintain the valve unit in its position, particularly against turning, an auxiliary support is provided, such as cooperating parts elsewhere between the valve casing 10 and the valve unit 20. I prefer to place such auxiliary support opposite to the mounted end. To this end (Figs. 1, 3, 4 and 5) there is a lug 27 formed on the valve unit housing 21, and a lug 28 on the valve casing. The lug 28 is recessed at 29 to receive the lug 27, the two being shaped to permit sliding of lug 27 in the recess 29 as the valve unit is drawn into mounted position by threads 19. The lug 28 is provided (Fig. 5) with lateral enlargements 30 near the top which may be gripped by inwardly turned fingers 31 on a cap 32 which fits over the lug 28, and which is held thereto by a screw 33 passing through the cap 32 against the valve unit lug 27 (Fig. 5).

After the valve unit is mounted to the nipple, and the combined valve casing, nipple and valve unit form a rigid structure, the cap 32 is placed in position, and screw 33 tightened to insure maintenance of the desired position. These parts are readily accessible through the port 12.

The valve unit is one which opens in two ports, one valve member moving against the pressure of the liquid, and the other valve member moving with the pressure of the liquid. The areas on which the pressure acts are made substantially equal to produce a balanced action. In the top of the valve unit housing and in the bottom 23 the valve seats are formed. These may be provided by special material, such as non-corrodible substance. I insert seats of such material, and prefer to use material that can be ground with a grinding composition. I show inserted seats of Monel metal. These are in the form of rings 35 and 36 swedged into openings therefor. They have ground conical seats 37 and 38 respectively. The seats are of different sizes in order to make the areas which are exposed to the pressures substantially equal. In the construction illustrated the port 11 is contemplated as the pressure inlet, and in consequence of the tapering of the seats, the ring seat of the valve member which opens in the direction of the flow must be the larger. Each ring seat has a cylindrical portion 39 serving as a guide for parts of the valve member.

The valve member (Fig. 6) comprises generally a stem having rigid therewith valve members and guiding means. The valve members are shown as 40 and 41, having ground conical seating areas 42 and 43 respectively. They are fixedly united and so spaced that they seat simultaneously. Guiding pins or lugs 44 and 45 are carried by the seating members, and coact with the cylindrical guiding surface 39 of the seat rings. The valve members are properly spaced by means of a spacer 46 in the form of a tube with ground ends 47 and 48 fitting into suitable recesses formed by annular flanges 49 and 50 in the respective valve members. Through the tube and through holes in the valve members passes a rigid stem 51 with a head 52 on the lower end, and with threads 53 beyond the valve member 40. The stem beyond the threads 53 has a reduced diameter as at 54, and then, merely for convenience, is further reduced in diameter as at 55. Over the stem there is threaded a nut structure 56 which coacts with head 52 to clamp the valve members against the spacer 46.

The nut structure 56 has an elongated upper end 57 which is cylindrical and which slides as a guide for the valve stem unit in a socket or projecting cylinder 58 formed on the outside of valve casing plate 13. A groove 59 is formed in the wall of the cylinder to prevent a dash pot action therein from too tight a fit of the parts. The top of the socket head 58 has an opening 60 for the stem portion 55, and at the outer end about the stem 55 has a stuffing box structure 61.

Means for operating the valve unit is provided, and the drawings show such means including a lever and a float, permitting use of the valve automatically to control a supply of liquid to a chamber containing the float for maintaining a given level in the chamber. On top of the valve there is a mounting for a lever 65 which operates the valve stem. The mounting is carried by the socket head 58, and the latter is made round in part so that the mounting structure may be turned in any direction relative to the valve casing about the axis of the valve stem. The particular structure is a ring 66 (Fig. 7) which fits snugly over the socket head. The head is grooved at 67 to receive the ring. The ring carries two projections, normal to the curvature of the ring, and preferably alined with each other, one of which is designated 68, the other being 69. The projection 68 is threaded at the end 70 for receiving a nut 71. An arcuate yoke 72 (Fig. 8) has a groove 73 which receives the outer surface of the ring 66 in its deepest part and which at its edges 74 engages the cylindrical surface of the socket head 58. The yoke has a tubular lug 75 normal to its curvature through which the stud 68 extends. The tightening of nut 71 locks the ring 66 in the groove at any angle of adjustment about the stem of the valve. From the lug 75 a riser 78 extends as a guide, which may be vertically slotted for receiving and guiding one end of lever 65.

On the other rod like projection or lug 69 on ring 66 there is pivoted at 79 a link 80, the other end of which is pivoted at 81 to lever 65. A pivotal connection 82 is carried on the stem 55 for connection to lever 65.

The free end of lever 65 may be operated by such means as a float. The float may be so adjusted that its weight opens the valve, and its buoyancy in the liquid closes it. I have shown an adjustable mechanism for attaching a float to the lever, so that the effective lever arm is changed by an angular adjustment at the point of attachment. These parts are all shown in Figs. 1, 9, 10 and 11 on sheet 1 of the drawings.

A rod 85 is provided at one end with a float 86, shown in fragmentary section. The arm 65 carries a large circular plate 87 (Fig. 11) mounted thereon which projects beyond the edges of the lever. It is screwed to the arm by screws 88 (Fig. 10). The plate has a series of holes about the edge, in pairs, which are diametrically opposite, three pairs being shown. On one side the series is designated 89 and on the other side the companion holes are designated 90. The lever 65 and the plate 87 have registering holes centrally of the plate as at 91. A block 92 has two pins 93 and 94 which fit into a pair of holes 89 and 90. The block has a groove 95 therein to receive a part of the float-carrying arm 85. It has a second groove or recess 96 crossing the first groove, but deeper, narrower and substantially semi-circular. At the bottom of the second groove there is a hole registering with the hole 91 when the pins 93 and 94 are in the holes of the plate. A ring 97 for encompassing the arm 85 has a threaded stud 98 thereon forming of the whole an eyelet structure. The ring fits into groove 96 and holds the arm 85 in groove 95. The stud 98 passes through the registering holes 91 to receive a clamping nut 99 on the rear side of arm or lever 65.

Figs. 12, 13 and 14 show a modified form of the valve in which the valve unit 101 is prevented from turning relative to the valve casing 102 by an interlocking structure between them. The valve unit has a tubular end 103 which fits snugly into a circular opening in the valve casing wall 104 (Fig. 14). A key 105 on the tubular part slides in a keyway 106 in the wall of the opening. The key has a tapered portion 107 which registers with a similar tapered part of the key-way. Two or more such keys and key-ways may be provided. The tubular end is threaded internally at 111, and a removable ported flange or nipple 108 is turned into place until the surfaces indicated at 110 register in tight connection.

It will be understood that the present invention in its various novel features may be altered in construction without departing from the scope of the invention, and that the valve is not necessarily limited to use with a float-operated stem. It may be used for steam as well as liquid, and has a variety of uses which will be obvious to those skilled in the art. In the appended claims I aim to express the invention in its fullest scope and contemplate those changes and modifications which depart from this description; yet which fall within the invention as expressed by the claims.

I claim:

1. A valve comprising in combination, a ported valve casing, a removable housing within said casing adapted to be mounted over a casing port and to close said port from the interior of said casing and to connect said port to the interior of said housing, a valve in said housing, operating means for said valve, and means outside of said casing extending through the port covered by said housing for mounting the housing to the casing.

2. A valve comprising in combination a ported valve casing, a removable housing within said casing adapted to be mounted over a casing port and to close said port from the interior of said casing outside of said housing and to connect said port to the interior of said housing, a valve in said housing, operating means for said valve, and a nipple structure adapted to enter the port and to coact with said housing to clamp the wall of said casing about the port between the housing and the nipple.

3. In a valve structure in combination a valve casing having a large opening therein and a port, a valve-containing housing having an open face adapted to be inserted into the large opening of the casing and to be placed with its open face against said port to cover the same, threads formed on the inner side of the housing near the open face, and an annular structure having coacting threads at one end adapted to be inserted into the casing at the port covered by said housing for engaging the threads of said housing, and having a retaining flange abutting the outside of the casing, whereby the annular structure and the housing clamp the wall of the casing about the port between them.

4. In combination, a casing having a port therein, a valved housing with an open face contained inside said casing over said port, a nipple having one end adapted to enter said port and a flange adapted to engage the casing, and threads formed within the housing to engage threads on the inserted end of the nipple, whereby to clamp the casing between the nipple flange and the housing.

5. In combination, a casing having a port therein, a valved housing with an open face contained inside said casing, over said port, a nipple having one end adapted to enter said port and a flange adapted to engage with said casing, threads formed inside said housing to engage with threads on the inserted end of said nipple, and means to hold the housing non-rotatable with respect to said casing.

6. In combination, a casing having a port therein, a valved housing with an open face contained inside said casing over said port, a nipple having one end adapted to enter said port and a flange adapted to engage with said casing, threads formed inside said housing to engage with threads on the inserted end of said nipple, means to hold the housing non-rotatable with respect to said casing, and means for operating the valve of the housing extending through said casing.

7. A valve comprising in combination a valve casing having two ports and a large opening therein, a plate covering said opening, a housing insertable into said casing through said large opening, a valve member and seat in said housing, means for opening said valved housing adapted to extend through said plate, said housing being otherwise closed except for one face which is adapted to fit against said casing and to cover one of said ports, and a flanged nipple retained by said casing extending through said internally covered port into said housing, said housing and said nipple being provided with coacting parts whereby to clamp them together with the wall of the casing between them.

8. In a valve, in combination, a valve casing having an opening therein, a valve unit inside said casing with a tubular end adapted to fit into said opening, threads formed inside said tubular end, a nipple having a threaded part to be received by the threads of said tubular part, and having a shoulder adapted to rest against the valve casing about said opening, said tubular end having a tapered key thereon, and said opening having a registering tapered keyway therein to receive the key.

9. In a valve, in combination, a casing having a port therein, a housing contained inside said casing, said housing containing in its wall a valve, said housing having an opening therein adapted to cover a port of the valve casing, threads formed inside said housing, a nipple with a retaining flange adapted to engage against the outside wall of the casing and a threaded end adapted to be inserted into the covered port to engage the housing, and interlocking coacting parts, one on the housing at the end opposite the nipple, and the other on the casing, said parts being adapted to hold the housing nonrotatable with respect to the casing.

10. A mounting structure comprising in combination, a stud on which the mounting is to be made having a circular peripheral groove therein, a ring adapted to slip over the stud and to enter in part into said groove, a threaded lug on said ring, a yoke with a hole therein adapted to fit over said ring with the lug passing through and beyond the yoke and having edges adapted to press against the mounting stud, said yoke having said edges encompassing a portion of the ring in mounted position, and a nut on said threaded lug for drawing the yoke and the opposite part of the ring toward each other with said part of the ring in the groove.

11. Means for mounting two arms comprising an arm, a plate on said arm containing a positioning hole, a block having a positioning pin to fit into said positioning hole, said arm, said plate and said block having each registering holes in said relation of the block and plate, said block having a recess therein uniting with its said hole, said block having a groove transversely of the recess therein to receive a second arm to be united to the first, a second arm, retaining means having a part to engage said second arm and to hold it in said groove, and adapted itself to fit into the said recess in said block, a stud on said retaining means adapted to pass through the holes in the block, plate and first arm, and means on the rear side of the first arm to hold said stud.

In testimony whereof I have hereunto affixed my signature.

JOHN J. SKELLY.